United States Patent [19]

Almasi et al.

[11] 3,714,037
[45] Jan. 30, 1973

[54] FLOCCULATING APPARATUS AND METHOD

[75] Inventors: Gabriel Charles Almasi, Beaver; William Slusarczyk, Industry, both of Pa.

[73] Assignee: Crucible Inc., Pittsburgh, Pa.

[22] Filed: Jan. 27, 1971

[21] Appl. No.: 110,197

[52] U.S. Cl. ..................................210/42, 210/223
[51] Int. Cl. ..............................................B01d 17/06
[58] Field of Search............210/52, 54, 222, 223, 42; 209/213, 214, 215, 223, 232

[56] References Cited

UNITED STATES PATENTS

| | | | |
|---|---|---|---|
| 2,954,122 | 9/1960 | Colburn | 210/222 X |
| 2,652,925 | 9/1953 | Vermeiren | 210/222 |
| 3,549,527 | 12/1970 | Peck et al. | 210/223 X |
| 3,608,718 | 9/1971 | Aubrey et al. | 210/222 |
| 3,536,198 | 10/1970 | Bartnik et al. | 210/223 |

Primary Examiner—Samih N. Zaharna
Assistant Examiner—T. A. Granger
Attorney—Clair X. Mullen, Jr.

[57] ABSTRACT

Apparatus and method for the removal of magnetic particles from a liquid stream by introducing the particle-containing liquid stream into a restricted passage having a large width to height ratio without any change in cross-sectional area. The passage is provided with a magnetic field, the lines of force of which are substantially at right angles to the lengthwise liquid-flow direction through said passage. The particles are magnetized and agglomerate so that downstream they may be removed by a filter or a settling tank.

5 Claims, 4 Drawing Figures

PATENTED JAN 30 1973

3,714,037

TO DC POWER

INVENTORS
GABRIEL C. ALMASI
& WILLIAM SLUSARCZYK

By Clair T. Mullen

Attorney

FLOCCULATING APPARATUS AND METHOD

To prevent pollution of streams it is necessary to remove contaminants from industrial waste water prior to discharging the same into streams. Some industrial waste water and particularly that associated with metal-producing operations, such as the operation of an oxygen-steelmaking furnace, contain iron or iron alloy particles in extremely finely divided form. It is customary practice to remove these particles prior to discharge of the water into streams by introducing the particle-containing water to a settling tank wherein the iron particles are permitted to settle-out. Upon settling-out of the particles the water is then discharged into streams. In operations such as an oxygen-steelmaking furnace, water is used to "scrub" the gas issuing from the furnace, which gas contains extremely fine iron and iron alloy particles. These particles which are present in the waste water that has been used in the scrubbing operation are so fine that extremely long settling times are required to separate the particles out of the water if a settling tank is used, and they are generally too fine to be separated out by the use of conventional screening and/or filtering techniques.

It is accordingly the primary object of the present invention to provide an apparatus and method for treating industrial waste water containing particles of magnetic material to make the particles readily removable from the water by conventional techniques, such as the use of a settling tank or filter.

A more specific object of the invention is to provide for the removal of magnetic particles from industrial waste water by magnetizing the particles during flow to conventional particle-removal means to agglomerate the particles prior to their reaching the removal means so that the resulting larger, agglomerated particles may be more easily removed.

These and other objects of the invention as well as a complete understanding thereof may be obtained from the following description and drawings, in which.

Broadly in the practice of the invention liquid, which is typically water, passes through conventional cylindrical piping to conventional particle-removal means such as a filter or settling tank. The piping, in accordance with the present invention, is intersected at a location up stream from the particle-removal means by a restricted passage having a large width to height ratio and preferably being of generally rectangular cross section with the cross-sectional area being substantially equal to the cross-sectional area of the piping. Along the width and exterior of the restricted passage is positioned a plurality of opposed electromagnets which when energized produce within said passage a magnetic field the lines of force of which are substantially at right angles to the lengthwise, fluid-flow direction through the passage. In this manner the magnetic particles within the liquid are magnetized and agglomerated during flow through the restricted passage. Consequently, the particles are more easily removable by the conventional filter or settling tank than would have been the case in their finely divided, unagglomerated form. During agglomeration of the magnetic particles nonmagnetic material, which either has adhered to the particles or is trapped between particles during agglomeration, is also removed from the liquid. It may be seen, therefore, that with the practice of the invention although only magnetic particles will agglomerate such incidentally results in removal of nonmagnetic contaminants from the water.

Typically the electromagnets are energized to produce a magnetic field having an intensity of about 900 to 1,200 gauss at the center of the restricted passage. The magnetic field should be varied in intensity depending upon the size of the particles to be removed, the ratio of particles to liquid volume, liquid flow rate, and the shape of the particles. By varying the intensity of the magnetic field it is possible to magnetize the particles without attracting them toward the electromagnets and thus causing them to adhere to the interior surface of the passage. If, of course, the intensity of the field is such as to cause adherence of the particles this could result in blockage of the passage and shutdown of the system.

Figure 1:
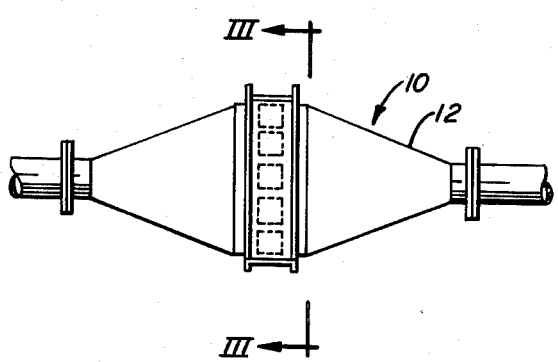
FIG. 1 is a plan view of one embodiment of apparatus in accordance with the present invention.
Figure 3:
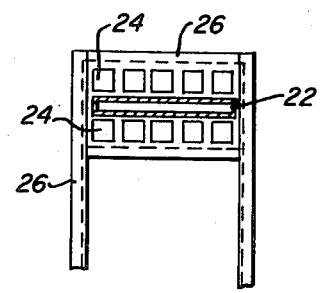
FIG. 3 is a sectional view taken along lines III—III of FIG. 1.
Figure 2:
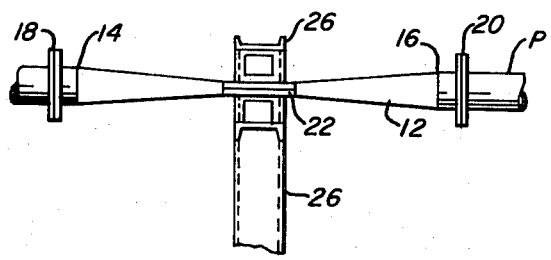
FIG. 2 is an elevation in partial section of one embodiment of the apparatus of FIG. 1.

With reference to the drawings, and for the present to FIGS. 1, 2 and 3, thereof, there is shown conventional cylindrical piping designated as P within which is positioned the flocculating apparatus of the invention, designated generally as 10. The apparatus comprises a casing 12, which is of nonmagnetic material such as stainless steel. The casing 12 has a cylindrical liquid inlet 14 and a cylindrical liquid outlet 16 both of which correspond in diameter to that of the piping. Couplings 18 and 20, respectively, are provided for connecting the apparatus 10 to the piping. The casing 12 is tapered from the ends to the center thereof to provide a passage 22 of generally rectangular cross section with a large width to height ratio, as best shown in FIG. 3. Preferably, the width is at least three times greater than the height. The cross-sectional area of this passage is substantially equal to the cross-sectional area of the piping. Positioned along the exterior width of passage 22 are a plurality of opposed electromagnets 24. The electromagnets 24 are oriented with the poles of opposite magnets being of opposite polarity. The electromagnets 24 are contained between the exterior surface of passage 22 and four rectangularly arranged channel bars 26. The channel bars 26 are of steel or other magnetic material for the purpose of providing a return path for the magnetic field produced by the electromagnets 24.

From this arrangement as above described it may be seen that upon energizing the electromagnets 24 a magnetic field will be produced within the rectangular passage 22 with the lines of force of the magnetic field being substantially at right angles to the lengthwise liquid-flow direction through the casing 12 and passage 22 thereof. In this manner with liquid flow through the piping the magnetic particles contained within the liquid will be magnetized and agglomerated during flow with the liquid through the passage 22. Thereafter they may be more readily removed by conventional particle-removal means such as a conventional filter or settling tank (not shown) down-stream of the flocculating apparatus of the invention.

Figure 4:
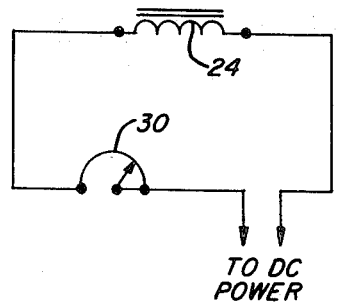
FIG. 4 is a circuit diagram of electrical circuit associated with the apparatus embodiment.

As mentioned above, it is desirable to permit regulation of the intensity of the magnetic field so that the field is of sufficient intensity for a particular application to cause the particles to agglomerate and yet not adhere substantially and permanently to the interior of the passage 22. For this purpose as shown in FIG. 4 the electromagnets 24 may be connected to a line source of direct current power through a conventional rheostat 30, the adjustment of which varies the energization level of the electromagnets and correspondingly varies the intensity of the magnetic field produced thereby.

It is obvious that automatic means may be provided in association with the described flocculating apparatus of the invention to determine the volume ratio of the magnetic particles to liquid and the flow rate thereof to indicate to an operator on a continuous basis the ratio of particles to liquid so that the magnetic field may be correspondingly adjusted. Further, this could be achieved automatically in response to particle-to-liquid volume ratio determinations.

It is further obvious that the flocculating apparatus of the invention will function with the casing 12 oriented other than as shown in the drawings, and consequently the term "height" as used herein with respect to this casing has reference to the smaller dimension thereof with the term "width" having reference to the greater dimension no matter what the orientation of the casing in a particular application.

We claim:

1. Apparatus for removing magnetic particles from a liquid stream, said apparatus comprising a casing of nonmagnetic material having liquid inlet and outlet passages for liquid flow through said casing, said casing having a generally rectangular interior cross section with the width thereof being substantially greater than the height thereof and the cross-sectional area thereof being substantially equal to the cross-sectional area of each of said passages, a magnet assembly for producing within said casing a magnetic field the lines of force of which are substantially at right angles to the lengthwise fluid flow direction of said casing, whereby said magnetic particles are magnetized and agglomerated during passage through said casing with said liquid stream, said magnet assembly including a first plurality of electromagnets positioned exterior of said casing and along a width thereof, a second like plurality of electromagnets positioned on the opposite exterior of said casing with each of said magnets being substantially opposite a magnet of said first plurality and with the facing poles of each of said opposed magnets being of opposite polarity, an enclosure of magnetic material surrounding said magnet assembly and casing for providing a return path for said magnetic field, and a settling tank connected to said outlet passage into which said liquid stream containing said agglomerated particles is introduced for separation of said agglomerated particles from said liquid.

2. The apparatus of claim 1 wherein the width of said casing is at least three times the height thereof.

3. The apparatus of claim 1 wherein said nonmagnetic material of said casing is stainless steel.

4. The apparatus of claim 1 wherein means are provided for varying the intensity of said magnetic field.

5. A method for removing magnetic particles from a liquid stream, said method comprising introducing said particle-containing liquid from a first liquid passage into and through a second restricted liquid passage having a cross-sectional area substantially equal to that of said first passage with the width of said second passage being at least three times greater than the height thereof, producing within said second passage a magnetic field that is varied in intensity directly with liquid flow velocity through said second passage and the lines of force of which are substantially at right angles to liquid flow direction through said second passage to magnetize said magnetic particles and cause said particles to agglomerate and separating said agglomerated particles from said liquid stream by introducing said agglomerated-particle-containing liquid into a tank and maintaining the same therein for a time sufficient to permit said agglomerated particles to sink within said tank.

* * * * *